US011442187B2

(12) United States Patent
Tang et al.

(10) Patent No.: US 11,442,187 B2
(45) Date of Patent: Sep. 13, 2022

(54) MICROSEISMIC WIRELESS MONITORING, RECEIVING AND EARLY WARNING SYSTEM OF ROCK

(71) Applicant: Dalian University of Technology, Dalian (CN)

(72) Inventors: Shibin Tang, Dalian (CN); Jiaming Li, Dalian (CN)

(73) Assignee: Dalian University of Technology

( * ) Notice: Subject to any disclaimer, the term of this patent is extended or adjusted under 35 U.S.C. 154(b) by 308 days.

(21) Appl. No.: 16/833,084

(22) Filed: Mar. 27, 2020

(65) Prior Publication Data

US 2021/0173107 A1 Jun. 10, 2021

(30) Foreign Application Priority Data

Dec. 10, 2019 (CN) .......................... 201911258982.3

(51) Int. Cl.
| | |
|---|---|
| *G01V 1/28* | (2006.01) |
| *G01V 1/22* | (2006.01) |
| *G08B 7/06* | (2006.01) |
| *G08B 21/18* | (2006.01) |

(52) U.S. Cl.
CPC ................ *G01V 1/288* (2013.01); *G01V 1/22* (2013.01); *G08B 7/06* (2013.01); *G08B 21/18* (2013.01)

(58) Field of Classification Search
USPC ........................................................ 702/16
See application file for complete search history.

(56) References Cited

U.S. PATENT DOCUMENTS

| | | | | |
|---|---|---|---|---|
| 2014/0100786 A1* | 4/2014 | Ma | ........................... | G01V 1/40 702/16 |
| 2017/0343689 A1* | 11/2017 | Dykstra | .................. | G01V 1/288 |
| 2018/0106147 A1* | 4/2018 | Lakings | ................ | E21B 49/003 |
| 2019/0302291 A1* | 10/2019 | Lolla | ....................... | G01V 1/288 |
| 2019/0324166 A1* | 10/2019 | Lolla | ........................ | G01V 1/42 |

\* cited by examiner

*Primary Examiner* — Paul D Lee

(74) *Attorney, Agent, or Firm* — McAndrews, Held & Malloy, Ltd.

(57) ABSTRACT

The present invention discloses a microseismic wireless monitoring, receiving and early warning system of rock, which is connected with microseismic intelligent acquisition and data wireless transmission systems of rocks through a satellite. The microseismic wireless monitoring, receiving and early warning system of rock comprises a wireless receiving module, used for receiving a microseismic data packet processed by each microseismic signal wireless transmission system of rock through the satellite; a storage module, connected with the wireless receiving module, internally saving basic data information of each microseismic signal transmission system of the rock, automatically and correspondingly storing the microseismic data packet in real time and managing the microseismic data packet; a processing module, connected with the storage module and used for computing and analyzing to obtain microseismic source level information of a rock breakage signal and transmitting the information to the storage module to be stored.

10 Claims, 1 Drawing Sheet

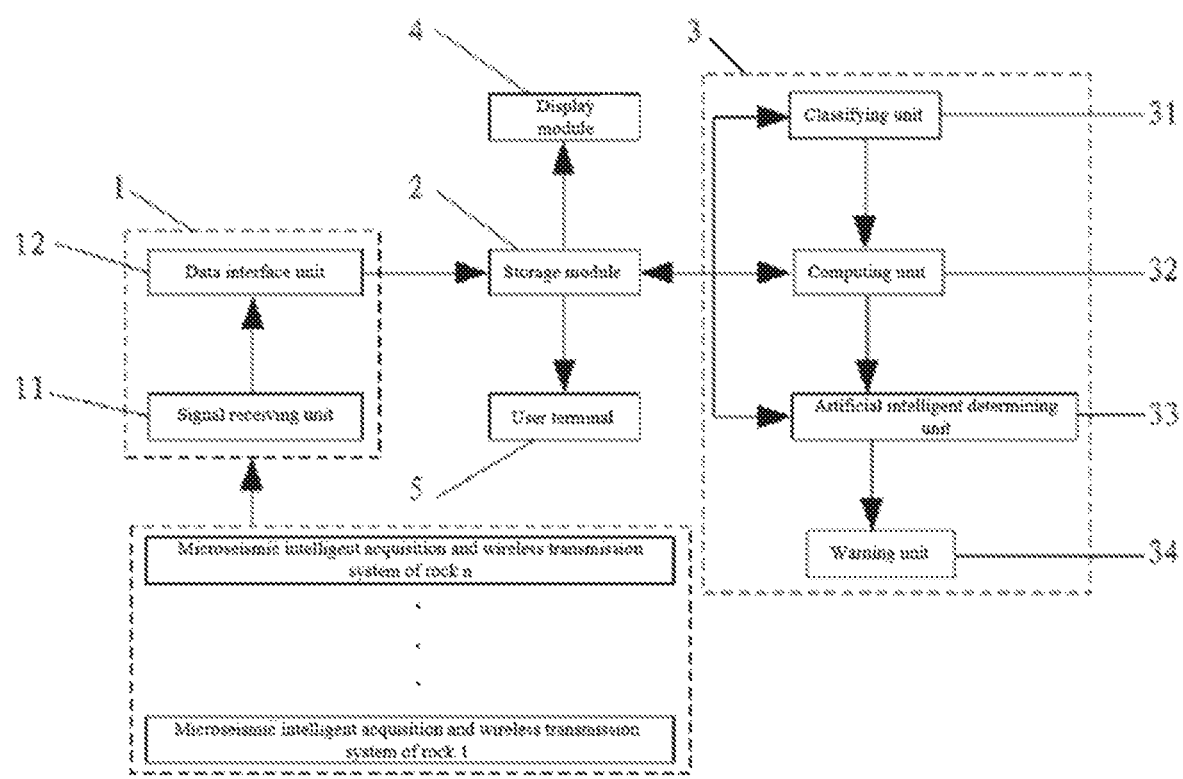

MICROSEISMIC WIRELESS MONITORING, RECEIVING AND EARLY WARNING SYSTEM OF ROCK

CROSS-REFERENCE TO RELATED APPLICATIONS

This application claims priority to Chinese patent application 201911258982.3, filed Dec. 10, 2019, the disclosure of which is incorporated herein by reference.

TECHNICAL FIELD

The present invention relates to the technical field of rock microseism, and in particular, to a microseismic wireless monitoring, receiving and early warning system of rock.

BACKGROUND

Rock breakage may propagate in a rock in the form of an elastic wave so as to be called microseism. Analysis on microseismic information generated by the rock breakage can determine the position of a microseismic source, breakage and the like to facilitate stability monitoring, analysis and early warning of rock engineering. With the breakthrough of electronic technology and equipment, especially the improvement of data processing capability of the computer, a microseismic monitoring technology is rapidly developed. The microseismic monitoring technology has entered a full digital age to be an advanced technology for monitoring rock engineering disasters. With the continuous development of microseismic technology, various countries in the world gradually apply it to various fields of rock engineering stability monitoring and conduct related researches on microseismic activities.

A microseismic wireless monitoring, acquiring and transmitting system is configured to acquire and transmit microseismic information generated by the field rock engineering. The microseismic wireless monitoring, acquiring and transmitting system can acquire a mass of microseismic data every day. How to analyze and process such mass of microseismic data is the key point and the difficulty in the work. If the data processing speed is lagged, some key information may be missed. Therefore, real-time, high-efficiency and rapid processing of the microseismic data is of great significance to the safety of the rock engineering. However, to a mass of microseismic monitoring data, problems of redundant content, weak real-time display, large location error and the like are easy to generate in the prior art.

SUMMARY

An objective of the present invention is to provide a high-efficiency, high-quality and rapid microseismic wireless monitoring, receiving and early warning system of rock.

To achieve the above objective, the present invention provides a microseismic wireless monitoring, receiving and early warning system of rock, which is connected with n microseismic intelligent acquisition and data wireless transmission systems of rocks through a satellite, wherein n is a positive integer larger than 4. The microseismic wireless monitoring, receiving and early warning system of rock comprises:

a wireless receiving module, used for receiving a microseismic data packet processed by each microseismic signal wireless transmission system of rock through a satellite, wherein the microseismic data packet comprises microseismic information and time information;

a storage module, connected with the wireless receiving module, wherein the storage module utilizes a microseismic cloud platform (MCP) built by utilizing a cloud computing technology; the storage module internally saves basic data information of the n microseismic intelligent acquisition and data wireless transmission systems of the rocks, automatically and correspondingly stores the microseismic data packet in real time and manages the microseismic data packet;

a processing module, connected with the storage module and used for computing and analyzing the microseismic information to obtain a waveform parameter and a characteristic parameter of the microseismic information, classifying microseismic signals by utilizing neural network and deep learning artificial intelligence recognition technologies according to the waveform parameter and the characteristic parameter to obtain classification information of the microseismic signals, and processing the classification information to obtain a rock breakage signal; then computing according to the rock breakage information as well as its corresponding time information and the basic data information to obtain microseismic source position information and microseismic source generation time to further obtain microseismic source level information; wherein the processing module transmits the waveform parameter, the characteristic parameter, the microseismic source position information, the classification information, the microseismic source generation time and the microseismic source level information to the storage module to be correspondingly stored.

Preferably, the wireless receiving module comprises:

a signal receiving unit, used for receiving the microseismic data packet through the satellite;

a data interface unit, connected with the signal receiving unit and used for transmitting the microseismic data packet to the storage module.

Preferably, the processing module comprises:

a classifying unit, connected with the storage module and used for computing and analyzing the microseismic information to obtain the waveform parameter and the characteristic parameter of the microseismic information; classifying the microseismic signals by utilizing the neural network and deep learning artificial intelligence recognition technologies according to the waveform parameter and the characteristic parameter to obtain the classification information of the microseismic signals, wherein the classification information comprises noise information, blasting vibration information, knock information, vehicle vibration information and rock breakage information; extracting the rock breakage information after eliminating the noise information, the blasting vibration information, the knock information and the vehicle vibration information;

a computing unit, respectively connected with the storage module and the classifying unit, and used for computing according to the rock breakage information as well as its corresponding time information and the basic data information to obtain the microseismic source position information and the microseismic source generation time to further obtain the microseismic source level information;

an artificial intelligence determining unit, respectively connected with the storage module and the computing unit, internally installed with an expert database and used for determining stability of a rock area corresponding to the rock breakage signal according to the expert database, the microseismic source position information, the microseismic source generation time, the microseismic source level information, the waveform parameter and the characteristic parameter to obtain that the rock area corresponding to the rock breakage signal is stable or instable, and then conducting artificial check; if an artificial check result is consistent with an result of the artificial intelligence determining unit, not processing; if the artificial check result is not consistent with the result of the artificial intelligence determining unit, updating the expert database through machine learning.

Preferably, the processing module further comprises:

a warning unit, connected with the artificial intelligence determining unit and used for determining instability probability if the rock area corresponding to the rock breakage signal is determined to be instable, and transmitting warning information if the instability probability is determined to be large, wherein the warning information comprises acoustic warning, SMS warning and photoelectric warning.

Preferably, in the step to obtain the microseismic source position information and the microseismic source generation time, the following computational formula is utilized:

$$\sqrt{(X_k-X_0)^2+(Y_k-Y_0)^2+(Z_k-Z_0)^2}=v(t_k-t_0);$$

n equations are built through the formula to compute so as to obtain values of $X_0$, $Y_0$, $Z_0$ and $t_0$ and to further obtain the microseismic source position information and the microseismic source generation time;

in the formula: $X_k$, $Y_k$ and $Z_k$ represent three coordinates of a $k^{th}$ microseismic intelligent acquisition and data wireless transmission system of the rock, $X_0$, $Y_0$ and $Z_0$ represent three coordinates of the microseismic source position information, $t_0$ represents the microseismic source generation time, $t_k$ represents receiving time, and v represents a propagation speed of an oscillating wave.

Preferably, the step to further obtain the microseismic source level information specifically comprises:

obtaining microseismic source energy according to the microseismic source position information, and then obtaining a microseismic source energy level according to the microseismic source energy; after obtaining the microseismic source energy level, obtaining microseismic source strength according to the microseismic source position information, and then obtaining the microseismic source strength level according to the microseismic source strength, wherein the microseismic source level information comprises the microseismic source energy level and the microseismic source strength level.

Preferably, the basic data information comprises:

position information, serial number information and partition information of each microseismic intelligent acquisition and data wireless transmission system of the rock.

Preferably, the waveform parameter comprises:

amplitude, frequency, phase, wavelength and acceleration voltage amplitude.

Preferably, the microseismic wireless monitoring, receiving and early warning system of rock further comprises:

a display module, connected with the storage module and used for displaying the position information, the serial number information and the partition information of each microseismic intelligent acquisition and data wireless transmission system of the rock, the microseismic source generation time, the waveform parameter and the characteristic parameter of the oscillating wave, the time information, the microseismic source position information and the microseismic source level information.

Preferably, the microseismic wireless monitoring, receiving and early warning system of rock further comprises:

a user terminal, connected with the storage module, wherein through the user terminal, a worker and a user query the position information, the serial number information and the partition information of each microseismic intelligent acquisition and data wireless transmission system of the rock, the microseismic source generation time, the waveform parameter and the characteristic parameter of the oscillating wave, the time information, the microseismic source position information, the microseismic source level information and the stability of the rock breakage signal.

According to specific embodiments provided by the present invention, the present invention discloses the following technical effects:

the present invention increases the processing speed of the microseismic data, improves the management capability of the microseismic data, and solves the problems that the microseismic big data processing speed is lagged, the amount is huge, the content is redundant, real-time display is weak and the like. Additionally, the present invention can simultaneously receive and monitor multiple areas so as to have a wider application range.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic structural diagram of a microseismic signal receiving and early alarm system of rock in the present invention.

In the drawing: 1—wireless receiving module, 2—storage module, 3—processing module, 4—display module, 5—user terminal, 11—signal receiving unit, 12—data interface unit, 31—classifying unit, 32—computing unit, 33—artificial intelligence determining unit, and 34—warning unit.

DESCRIPTION OF THE EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a high-efficiency, high-quality and rapidly-processing microseismic wireless monitoring, receiving and early warning system of rock.

To make the foregoing objective, features, and advantages of the present invention more apparent and more comprehensible, the present invention is further described in detail below with reference to the accompanying drawings and specific embodiments.

As shown in FIG. 1, the microseismic wireless monitoring, receiving and early warning system of rock of the present invention is connected with n microseismic intelligent acquisition and data wireless transmission systems of rocks through a satellite, wherein n is a positive integer larger than 4. The microseismic wireless monitoring, receiving and early warning system of rock comprises: a wireless receiving module 1, a storage module 2 and a processing module 3.

The wireless receiving module 1 is used for receiving a microseismic data packet processed by each microseismic signal wireless transmission system of the rock through the satellite, wherein the microseismic data packet comprises microseismic information and time information.

The storage module 2 is connected with the wireless receiving module 1. The storage module 2 utilizes a microseismic cloud platform built by utilizing a cloud computing technology. The storage module internally saves basic data information of the n microseismic intelligent acquisition and data wireless transmission systems of the rocks, automatically and correspondingly stores the microseismic data packet in real time and manages the microseismic data packet. The basic data information comprises position information, serial number information and partition information of n microseismic signal transmission systems of the rock.

The processing module 3 is connected with the storage module 2. The processing module 3 is used for computing and analyzing the microseismic information to obtain a waveform parameter and a characteristic parameter of the microseismic information, classifying microseismic signals by utilizing neural network and deep learning artificial intelligence recognition technologies according to the waveform parameter and the characteristic parameter to obtain classification information of the microseismic signals, and processing the classification information to obtain a rock breakage signal, then computing according to the rock breakage information as well as its corresponding time information and the basic data information to obtain microseismic source position information and microseismic source generation time to further obtain microseismic source level information. The processing module 3 transmits the waveform parameter, the characteristic parameter, the microseismic source position information, the classification information, the microseismic source generation time and the microseismic source level information to the storage module 2 to be correspondingly stored.

Specifically, the waveform parameter comprises amplitude, frequency, phase, wavelength and acceleration voltage amplitude.

As an optional embodiment, the wireless receiving module 1 of the present invention comprises a signal receiving unit 11 and a data interface unit 12.

The signal receiving unit 11 is used for receiving the microseismic data packet through the satellite.

The data interface unit 12 is connected with the signal receiving unit 11. The data interface unit 12 is used for transmitting the microseismic data packet to the storage module 2.

As an optional embodiment, the processing module 3 of the present invention comprises a classifying unit 31, a computing unit 32 and an artificial intelligence determining unit 33.

The classifying unit 31 is connected with the storage module 2. The classifying unit 31 is used for computing and analyzing the microseismic information by utilizing a microseismic data processing and analysis (MDPA) module to obtain the waveform parameter and the characteristic parameter of the microseismic information, classifying the microseismic signals by utilizing the neural network and deep learning artificial intelligence recognition technologies according to the waveform parameter and the characteristic parameter to obtain the classification information of the microseismic signals, wherein the classification information comprises noise information, blasting vibration information, knock information, vehicle vibration information and rock breakage information. The classifying unit also extracts the rock breakage information after eliminating the noise information, the blasting vibration information, the knock information and the vehicle vibration information.

The computing unit is respectively connected with the storage module and the classifying unit, and is used for computing according to the rock breakage information as well as its corresponding time information and the basic data information to obtain the microseismic source position information and the microseismic source generation time to further obtain the microseismic source level information.

The artificial intelligence determining unit is respectively connected with the storage module and the computing unit. The artificial intelligence determining unit is internally installed with an expert database and is used for determining stability of a rock area corresponding to the rock breakage signal according to the expert database, the microseismic source position information, the microseismic source generation time, the microseismic source level information, the waveform parameter and the characteristic parameter to obtain that the rock area corresponding to the rock breakage signal is stable or instable, and then conducting artificial check; if an artificial check result is consistent with an result of the artificial intelligence determining unit, not processing; if the artificial check result is not consistent with the result of the artificial intelligence determining unit, updating the expert database through machine learning.

The step of obtaining the waveform parameter of the microseismic information specifically comprises;

standardizing the microseismic signals to obtain a first signal; conducting characteristic extraction on the first signal to obtain a second signal; introducing the second signal into a spectrum measurement function to obtain a spectrogram; and obtaining a main frequency of the microseismic signal according to the spectrogram, and then determining the waveform parameter of the oscillating wave through a waveform component function.

The computing unit 32 is respectively connected with the storage module 2 and the classifying unit 31. The computing unit 32 is used for computing by utilizing a microseismic source location (MSL) module according to the rock breakage information as well as its corresponding time information and the basic data information to obtain the microseismic source position information and the microseismic source generation time to further obtain the microseismic source level information.

The artificial intelligence determining unit 33 is respectively connected with the storage module 2 and the computing unit 32. The artificial intelligence determining unit 33 is internally installed with an expert database and is used for determining stability of a rock area corresponding to the rock breakage signal according to the expert database, the microseismic source position information, the microseismic source generation time, the microseismic source level information, the waveform parameter and the characteristic parameter to obtain that the rock area corresponding to the rock breakage signal is stable or instable, and then conducting artificial check; if an artificial check result is consistent with an result of the artificial intelligence determining unit, not processing; if the artificial check result is not consistent with the result of the artificial intelligence determining unit, updating the expert database through machine learning.

As an optional embodiment, the processing module 3 of the present invention further comprises a warning unit 34, connected with the artificial intelligence determining unit 33 and used for determining instability probability if the rock area corresponding to the rock breakage signal is determined to be instable, and transmitting warning information if the instability probability is determined to be large, wherein the warning information comprises acoustic warning, SMS warning and photoelectric warning.

Specifically, in the step to obtain the microseismic source position information and the microseismic source generation time, the following computational formula is utilized:

$$\sqrt{(X_k-X_0)^2+(Y_k-Y_0)^2+(Z_k-Z_0)^2}=v(t_k-t_0);$$

n equations are built through the formula to compute so as to obtain values of $X_0$, $Y_0$, $Z_0$ and $t_0$ and to further obtain the microseismic source position information and the microseismic source generation time;

in the formula: $X_k$, $Y_k$ and $Z_k$ represent three coordinates of a $k^{th}$ microseismic intelligent acquisition and data wireless transmission system of the rock, $X_0$, $Y_0$ and $Z_0$ represent three coordinates of the microseismic source position information, $t_0$ represents the microseismic source generation time, $t_k$ represents receiving time, and v represents a propagation speed of an oscillating wave.

further, the step to further obtain the microseismic source level information specifically comprises:

obtaining microseismic source energy according to the microseismic source position information, and then obtaining a microseismic source energy level according to the microseismic source energy; after obtaining the microseismic source energy level, obtaining microseismic source strength according to the microseismic source position information, and then obtaining the microseismic source strength level according to the microseismic source strength, wherein the microseismic source level information comprises the microseismic source energy level and the microseismic source strength level.

Specifically, a computational formula to obtain the microseismic source energy is:

$$E_0 = 4\pi\rho v R^2 \int_0^\infty \left[\frac{a(t)*t}{g}\right]^2 dt;$$

in the formula: $E_0$ represents the microseismic source energy; $\rho$ represents the density of a propagation medium; v represents a propagation speed of an oscillating wave; R represents a distance between a microseismic source and the microseismic signal transmission system of the rock, R=v($t_k-t_0$); g represents a voltage amplitude sensitivity; a(t) represents an acceleration voltage amplitude.

The microseismic source energy is leveled according to a set microseismic source energy level value to obtain the microseismic source energy level.

A computational formula to obtain the microseismic source strength specifically is:

$$M_0 = \frac{4\pi\rho v^3 R\Omega_0}{F};$$

in the formula: $M_0$ represents microseismic source strength; F represents radiation coefficient; $\Omega_0$ represents displacement amplitude spectrum level.

A formula to obtain the microseismic source strength level specifically is:

$$M=\tfrac{2}{3}\log M_0-6.0;$$

in the formula: M represents the microseismic source strength level.

As an optional embodiment, the microseismic wireless monitoring, receiving and early warning system of rock of the present invention further comprises:

a display module 4, connected with the storage module 2 and used for displaying the position information, the serial number information and the partition information of each microseismic intelligent acquisition and data wireless transmission system of the rock, the microseismic source generation time, the waveform parameter and the characteristic parameter of the oscillating wave, the time information, the microseismic source position information and the microseismic source level information.

The microseismic source level information can be displayed in the form of colors.

As an optional embodiment, the microseismic wireless monitoring, receiving and early warning system of rock of the present invention further comprises a user terminal 5.

The user terminal 5 is connected with the storage module 2 through 5G network. The 5G network has the characteristics of high speed, high reliability, high flexibility, low time delay, low power consumption and the like. A worker authorizes an account and a password to a user. The user can log in a user management system through a browser or an application program interface by a mobile phone or a computer. The user management system is connected with the storage module 2 to be capable of obtaining the corresponding position information, the serial number information and the partition information of each microseismic signal transmission system of the rock, the microseismic source generation time, the waveform parameter of the oscillating wave, the time information, the stability, the microseismic source position information and the microseismic source level information. The user can randomly monitor a real-time situation of the rock such that the microseismic monitoring data is visible and clear to share effective information. The storage module 2 also supports the user to input a key word of a certain monitoring point to query such that the user can understand and take part in the specific analysis process to a certain extent.

In conclusion, the present invention has the following advantages:

a. the rock engineering is monitored in real time by utilizing the microseismic signals acquired in field, and receiving, storing, processing, locating and leveling of wireless monitored data are fully automatized, thereby largely reducing the workload of the worker; in combination with the MCP, the MAPA, the MSL and the like developed for microseismic wireless monitoring, the processing speed of the microseismic data is increased, the management capability of the microseismic data is improved, and the problems that the microseismic big data processing speed is lagged, the amount is huge, the content is redundant, real-time display is weak and the like are solved;

b. the microseismic wireless monitoring, receiving and processing system can receive and process the microseismic signals of wireless acquisition and transmission systems in multiple areas, and directly receives the microseismic signals of the single microseismic signal transmission system of the rock so as to have flexibility; an area to be monitored only needs to install a microseismic wireless monitoring; acquiring and transmitting system to complete acquisition; transmission, reception and process of the rock microseismic signals; the microseismic wireless monitoring, receiving and processing system independently stores, processes, locates and levels the microseismic signals of each area to change the original one-to-one inherent mode of each engineering acquisition system and the processing system, thereby saving the monitoring costs; correspondingly, the user can also check and manage the rock engineering to be monitored through the user management system in real time;

c. the MCP has the advantages of low costs, large storage capacity, strong expandability (infinite storage capacity), high reliability, parallel analysis and the like; the MAPA can conduct online computation; simulation ad analysis on microseismic original data and has the characteristics of self-adaption, a generalization function; a nonlinear mapping function, highly parallel processing and the like; the MSL can accurately locate a microseismic source; the computing module levels the strength and the energy of the microseismic signals to provide basic conditions for the later protection and process; and different levels of the strength show different colors in an area map to help determine an area in which the rock engineering disaster is prevented.

Each embodiment of the present specification is described in a progressive manner; each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A microseismic wireless monitoring, receiving and early warning system of rock, which is connected with n microseismic intelligent acquisition and data wireless transmission systems of rocks through a satellite, wherein n is a positive integer larger than 4; the microseismic wireless monitoring, receiving and early warning system of rock comprises:

a wireless receiver, used for receiving a microseismic data packet processed by each of the microseismic intelligent acquisition and data wireless transmission systems of rocks through a satellite, wherein the microseismic data packet comprises microseismic information and time information;

a storage module, connected with the wireless receiver, wherein the storage module utilizes a microseismic cloud platform built by utilizing a cloud computing technology; the storage module internally saves basic data information of the n microseismic intelligent acquisition and data wireless transmission systems of rocks, automatically and correspondingly stores the microseismic data packet in real time and manages the microseismic data packet; and a processor, connected with the storage module and used for computing and analyzing the microseismic information to obtain a waveform parameter and a characteristic parameter of the microseismic information, classifying the microseismic information by utilizing neural network and deep learning artificial intelligence recognition technologies according to the waveform parameter and the characteristic parameter to obtain classification information of the microseismic information, and processing the classification information to obtain a-rock breakage information, then computing according to the rock breakage information as well as its corresponding time information in the microseismic data packet and the basic data information to obtain microseismic source position information and microseismic source generation time to further obtain microseismic source level information, wherein the processor transmits the waveform parameter, the characteristic parameter, the microseismic source position information, the classification information, the microseismic source generation time and the microseismic source level information to the storage module to be correspondingly stored.

2. The microseismic wireless monitoring, receiving and early warning system of rock according to claim 1, wherein the wireless receiver comprises:

a signal receiver, used for receiving the microseismic data packet through the satellite; and a data interface, connected with the signal receiver and used for transmitting the microseismic data packet to the storage module.

3. The microseismic wireless monitoring, receiving and early warning system of rock according to claim 1, wherein the processor is internally installed with an expert database, and the processor is configured to:

compute and analyze the microseismic information to obtain the waveform parameter and the characteristic parameter of the microseismic information; classify the microseismic information by utilizing the neural network and deep learning artificial intelligence recognition technologies according to the waveform parameter and the characteristic parameter to obtain the classification information of the microseismic information, wherein the classification information comprises noise information, blasting vibration information, knock information, vehicle vibration information and rock breakage information; extract the rock breakage information after eliminating the noise information, the blasting vibration information, the knock information and the vehicle vibration information;

perform computation according to the rock breakage information as well as its corresponding time information in the microseismic data packet and the basic data information to obtain the microseismic source position information and the microseismic source generation time to further obtain the microseismic source level information; and determine stability of a rock area corresponding to the rock breakage information according to the expert database, the microseismic source position information, the microseismic source generation time, the microseismic source level information, the waveform parameter and the characteristic parameter to obtain a determination result which comprises that the rock area corresponding to the rock breakage information is stable or instable, and then conduct a check; if the check result is not consistent with the determination result update the expert database through machine learning.

4. The microseismic wireless monitoring, receiving and early warning system of rock according to claim 3, wherein the processor is further configured to:

determine instability probability if the rock area corresponding to the rock breakage information is determined to be instable, and transmit warning information if the instability probability is determined to be large, wherein the warning information comprises acoustic warning, SMS warning and photoelectric warning.

5. The microseismic wireless monitoring, receiving and early warning system of rock according to claim 3, wherein in the step to obtain the microseismic source position information and the microseismic source generation time, the following computational formula is utilized:

$$\sqrt{(X_k-X_0)^2+(Y_k-Y_0)^2+(Z_k-Z_0)^2}=v(t_k-t_0);$$

n equations are built through the formula to compute so as to obtain values of $X_0$, $Y_0$, $Z_0$ and $t_0$ and to further obtain the microseismic source position information and the microseismic source generation time;

in the formula: $X_k$, $Y_k$ and $Z_k$ represent three coordinates of a $k^{th}$ microseismic intelligent acquisition and data wireless transmission system of rock, $X_0$, $Y_0$ and $Z_0$ represent three coordinates of the microseismic source position information, $t_0$ represents the microseismic source generation time, $t_k$ represents receiving time, and v represents a propagation speed of an oscillating wave.

6. The microseismic wireless monitoring, receiving and early warning system of rock according to claim 5, wherein the basic data information comprises:

position information, serial number information and partition information of each microseismic intelligent acquisition and data wireless transmission system of rock.

7. The microseismic wireless monitoring, receiving and early warning system of rock according to claim 6, further comprising:

a display, connected with the storage module and used for displaying the position information, the serial number information and the partition information of each microseismic intelligent acquisition and data wireless transmission system of rock, the microseismic source generation time, the waveform parameter and the characteristic parameter of the oscillating wave, the time information, the microseismic source position information and the microseismic source level information.

8. The microseismic wireless monitoring, receiving and early warning system of rock according to claim 7, further comprising:

a user terminal, connected with the storage module, wherein through the user terminal, a worker and a user query the position information, the serial number information and the partition information of each microseismic intelligent acquisition and data wireless transmission system of rock, the microseismic source generation time, the waveform parameter and the characteristic parameter of the oscillating wave, the time information, the microseismic source position information, the microseismic source level information and the stability of the rock area.

9. The microseismic wireless monitoring, receiving and early warning system of rock according to claim 3, wherein the step to further obtain the microseismic source level information specifically comprises:

obtaining microseismic source energy according to the microseismic source position information, and then obtaining a microseismic source energy level according to the microseismic source energy; after obtaining the microseismic source energy level, obtaining microseismic source strength according to the microseismic source position information, and then obtaining a microseismic source strength level according to the microseismic source strength, wherein the microseismic source level information comprises the microseismic source energy level and the microseismic source strength level.

10. The microseismic wireless monitoring, receiving and early warning system of rock according to claim 1, wherein the waveform parameter comprises:

amplitude, frequency, phase, wavelength and acceleration voltage amplitude.

* * * * *